United States Patent
Blatter

[15] 3,678,733
[45] July 25, 1972

[54] FLUIDIC VISCOMETER

[72] Inventor: Albert Blatter, Southfield, Mich.
[73] Assignee: The Bendix Corporation
[22] Filed: Sept. 24, 1970
[21] Appl. No.: 75,058

[52] U.S. Cl. .................................................. 73/54, 137/81.5
[51] Int. Cl. ........................................................ G01n 11/00
[58] Field of Search ........................... 73/54, 55, 56; 137/81.5

[56] References Cited

UNITED STATES PATENTS 3,505,855  4/1970  Rolland .................................. 73/54 X
3,568,693  3/1971  Vandrey ............................ 137/81.5 X

*Primary Examiner*—Louis R. Prince
*Assistant Examiner*—Joseph W. Roskos
*Attorney*—Robert A. Benziger and Plante, Hartz, Smith and Thompson

[57] ABSTRACT

A fluidic viscometer is disclosed herein which includes a proportional fluidic amplifier and associated circuit means operative to provide an output pressure signal related to the viscosity of the fluid passing through the fluidic device. Fluidic from a pressure source enters a pressure port in the device and also, after passage through a laminar resistor, a control port whence it interacts with the pressure port stream. The pressure recovered from the combined stream is then related to the supply pressure or control pressure to indicate the viscosity of the fluid.

5 Claims, 6 Drawing Figures

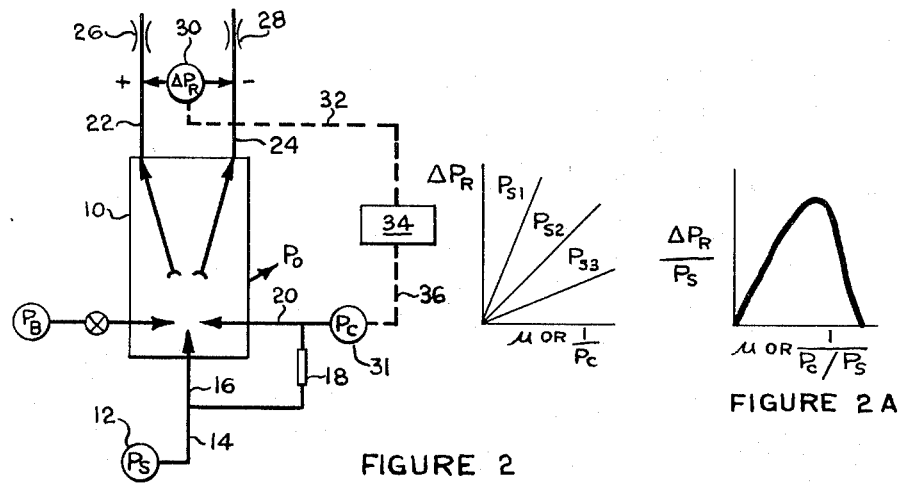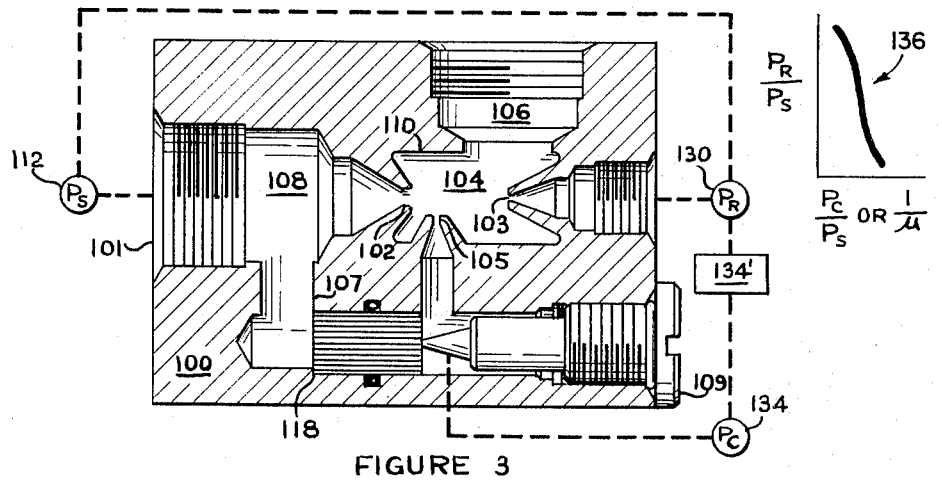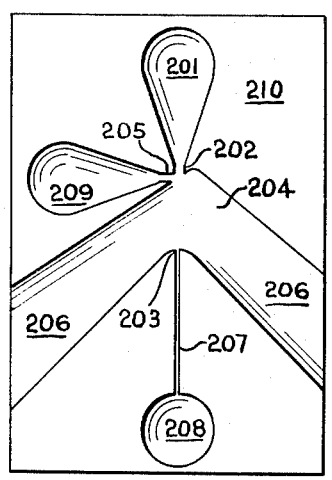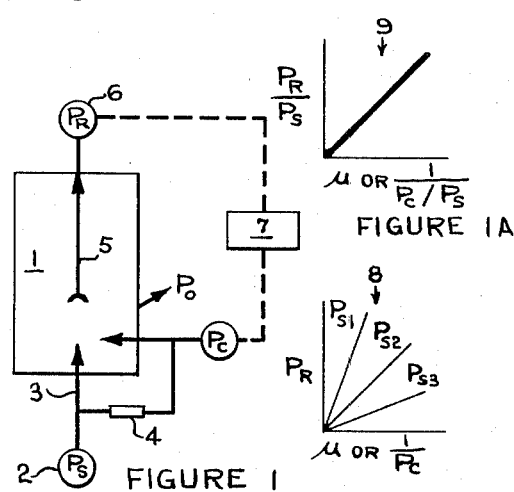

FLUIDIC VISCOMETER

BACKGROUND OF THE INVENTION

Field of the Invention

The present invention relates to the field of fluidics in general and in particular to that portion of the field of fluidics which deals with measuring devices.

It is well known that the field of fluidics makes use of many fluidic parameters in order to achieve the varied results obtained by the field. These parameters may include inertness, pressure, flow and resistance, both in the steady state and the transient state. In addition, the type of fluid, the temperature of the fluid environment, and Mach number, and the Reynolds number also represent specific parameters. Certain parameters are affected by the fluid viscosity. However, fluid viscosity is itself a variable quantity and as such would under predictable circumstances alter the values of those variable which are defined in terms of viscosity. At present, there exists no simple 00049therefore, an object of the present invention to provide a simple fluid viscosity measuring device. In view of the fact that fluid viscosity may vary during the operation of a fluid system, it is a further object of the present invention to provide a fluid viscosity measuring device capable of inclusion in a fluidic system so as to provide a constant monitoring of the viscosity of the fluid in the stream.

The prior art teaches that the viscosity of a fluid may be measured by using a capillary resistance element and by measuring the pressure differential across this element at known fluid flow rates and fluid temperatures. The density of the test fluid must be known and viscosity may then be computed. It is, therefore, an object of the present invention to provide a viscosity determining device and method which does not require specific knowledge of instantaneous fluid conditions. It is a further object of the present invention to provide a viscosity measuring device which does not require further computation following the taking of direct measurements. It is a still further object of the present invention to provide a viscosity measuring device which, following calibration, will yield direct measurement of fluid viscosity.

Additional known prior art requires the use of a movable element submerged in the fluid whose viscosity is to be measured. The velocity or resistance to movement of the element is then correlated to the fluid viscosity. The rate of decay of oscillation of an oscillatory submerged body also is used as the viscosity sensor. Since moving part devices are subject to wear and may affect the viscosity measurement of the fluid in which they are immersed, it is a still further object of the present invention to provide a pure fluidic (no moving part) viscosity determinative device. It is a further object of the present invention to provide such a device which is low in cost, simple to fabricate and operate, rugged, nonelectric and capable of use with a simple, direct readout device such as a pressure gauge. In line with the last noted objective of the present Invention, it is a further object to provide a fluidic amplifier for such a device having significantly high gain, linearity of operation, low hysteresis and a high signal to noise ratio. In order to achieve the last mentioned objective, it is a further object of the present invention to provide an improved proportional fluidic amplifier having high sensitivity and low turbulence characteristics.

SUMMARY OF THE INVENTION

The present invention comprises a fluidic proportional amplifier receiving as a pressurized supply fluid the fluid whose viscosity is to be determined. Laminar resistance means are provided intercommunicating the source of fluid pressure and at least one fluid control port. The viscosity of the fluid is then determined by comparing the output pressure signal with either the control port or the supply port fluid pressure. The proportional fluid device comprises, in the preferred embodiment, a fluid receiving port axially aligned with, and of a reduced dimension compared with, the pressure input nozzle. Fluid flow from the control port is then operative to divert varying portions of the fluid stream away from the primary receiving port and these excess quantities of fluid are then vented from the element.

BRIEF DESCRIPTION OF THE DRAWING

FIGS. 1 and 2 show schematic circuit diagrams illustrating some of the various circuit configurations possible using differing types of fluidic elements for the fluidic viscometer according to the present invention. FIG. 1 represents the simplest embodiment of the present invention.

FIGS. 1a and 2a represent viscosity readout graphs alternative to those shown in FIGS. 1 and 2.

FIG. 3 shows one embodiment of the fluid amplifier and laminar resistance combination according to the present invention in which the proportional amplifier device is comprised of a substantially cylindrical three-dimensional fluid interaction region, and includes variable means for adjusting the control port pressure.

FIG. 4 shows an alternative embodiment for the fluidic amplifier portion of the circuit, of the "two-dimensional" variety.

DETAILED DESCRIPTION OF THE PREFERRED EMBODIMENT

FIG. 1 shows a schematic circuit of the present invention. The circuit comprises a fluidic amplifier 1 having a supply of fluid under pressure 2 communicated by conduit 3 to the power nozzle of the amplifier 1. Fluid from supply 2 is also communicated via laminar flow resistance 4 to the the control port. The Single receiver means 5 receives the intermixed fluid streams from the power nozzle and the control port and fluid not received is vented to the ambient as at $P_o$. Pressure recovery is measured by suitable gauge means 6, shown here dead-ending the output of receiver means 5 and the comparison of pressure recovery, $P_R$, versus control port pressure, $P_c$, for varying values of supply pressure by suitable graphing means 7 will establish a calibration curve 8. FIG. 1a illustrates an alternative calibration curve 9 wherein the values have been normalized.

Referring now to FIG. 2, a circuit diagram for the present invention is shown. A proportional fluidic amplifier 10 is provided with a pressurized source of fluid 12 whose viscosity is to be monitored, determined, measured, or computed. The fluid is communicated through conduit 14 to junction 16 where a portion of the fluid is diverted away from the inlet to amplifier 10 and is passed through fluid resistor 18. Fluid resistor 18 is then connected via conduit 20 to at least one of the fluid amplifier 10 control ports where it is directed, in the known fashion, transverse to the main fluid stream within the interaction region of the amplifier. As is the nature of proportional fluid amplifiers of the type illustrated in FIG. 2, the main fluid stream flow will be divided between a pair of outlet channels as a function of the control fluid presSure. The outlet channels of the fluidic amplifier are connected to conduits 22 and 24 for the receipt of the divided main fluid stream and the control stream fluid. Output passages 22 and 24 include a pair of restrictions 26 and 28 which are operative to maintain pressure values upstream therefrom which are compared by means of the pressure differential comparator device 30 which provides an output signal indicative of the pressure differential existing between output passages 22 and 24. Control port pressure variations may be sensed by means of pressure gauge 31 which provides an output signal indicative of control port pressure variations. A bias pressure from the bias supply, $P_B$, may be used to establish a pressure against which the control port pressure, $P_c$, may operate or for trimming adjustments or the like. As such, it is nonessential to my invention.

As illustrated in FIG. 2, the pressure signals from differential comparator device 30 and the signal indicative of the control port pressure may be coupled by suitable means 32, 36 to a graphing means 34 which provides a graphical representation of the output pressure differential as compared with the control port pressure as illustrated in FIG. 2. Since the control port pressure will tend to increase as the temperature of the fluid increases and the viscosity of fluids varies with temperature, a comparison of the values graphed for known temperatures will provide a measure of the fluid viscosity. This would represent a calibration technique for the fluid tested which would allow subsequent measurements to yield viscosity directly. Note in FIG. 2a that the output signal ($\Delta P_R/P_S$), can contain a rising or falling signal and the range of the device can be controlled to provide the desired signal polarity.

In the description which follows, reference is made to "three-dimensional" and "two-dimensional" fluidic elements. This language is intended to distinguish between those fluidic elements in which the overall dimensions of the fluid interaction region are of the same order of magnitude (three-dimensional) and those in which one dimension, usually the height, is at least one order of magnitude smaller (two-dimensional).

Referring now to FIG. 3 of the drawing, a fluid flow apparatus based on FIG. 1 including the necessary elements to generate the various required pressure signals is illustrated. In this apparatus, the fluid amplifier laminar flow restriction and control pressure adjusting means are illustrated as being formed in a single block of material illustrated as 100. The block 100 includes a fluidic amplifier indicated generally as 110 and a laminar flow restrictor indicated as 118. Fluid from the pressure supply 112 is supplied to block 100 through suitable conduit, indicated here by a dash line, which may be coupled to the block 100 through the threaded connection illustrated 101. Fluid from source 112 enters the fluidic amplifier through nozzle 102 and is directed generally toward receiver port 103, which is situated on the opposite side of fluid reaction chamber 104 from the input, or power nozzle 102 and is axially aligned therewith. Fluidic element 110 includes further a control port 105 and a fluid vent means 106. Fluid from pressure source 112 is provided for control nozzle 105 by way of conduit 107 which branches off from the input passage 108 to provide pressure fluid to the resistance 118. Retaining means, illustrated generally as needle assembly 109, is operative to retain laminar resistance means in place without disturbing fluid flow. By suitable modifications, needle assembly 109 may also provide an additional element of control port fluid pressure adjustment. In establishing the calibration curves for the FIG. 3 embodiment, the output pressure recovered is normalized by referencing a pressure gauge 130 measuring output pressure to the input supply pressure as illustrated by the dash lines interconnecting the recovered pressure gauge 130 with the input pressure supply. This normalized value may then be plotted or graphed by recorder 134' as a function of the normalized control port pressure, measured by means of gauge 134, as illustrated by the graph shown generally as 136 in FIG. 3. The normalized control pressure axis also corresponds to the reciprocal of the viscosity shown as $1/\mu$.

Referring now to FIG. 4, an alternative embodiment for the fluidic element 110 is illustrated as element 210, whereas the element 110 in FIG. 3 is illustrated as a substantially three-dimensional device with a more or less cylindrical reaction chamber 104, the element of FIG. 4 is a two-dimensional device. Amplifier 210 receives fluid under pressure from a remote source, not illustrated through receiving port 201 where it is supplied to power nozzle 202. As with the FIGS. 2 and 3 embodiments, the fluid from the remote source, not illustrated, is also supplied to input port 209 by way of a laminar resistance element also not illustrated. Fluid from power nozzle 202 is directed toward primary receiving passage receiver port 203 which is spaced from power nozzle 202 across the fluid interaction region 204. Control port 205 receives fluid from control fluid inlet 209 and is arranged to direct a stream of fluid transverse to the power fluid stream from nozzle 202. By momentum interchange principles, this will cause the impact of the fluid stream to divert away from receiver port 203 by an amount proportional to the control fluid signal. In order to eliminate fluid which is not received by receiver port 203 from the fluid interaction region 204, fluid vent means 206 are arranged on either side of fluid receiver port 203 to receive this excess fluid. Fluid received by receiver port 203 flows through passage 207 to fluid port 208 where it may be exhausted from fluid amplifier 210 for measurement by suitable pressure, or other type, measuring means not illustrated. Fluid port 208 may be dead-ended and the fluid pressure in port 208 will be highest in this condition.

It will be observed from FIGS. 1, 3 and 4 that a fluidic amplifier of the proportional amplifier type having but a single or primary receiver port may be advantageously used in the practice of my invention. It will be observed from FIG. 2 that the conventional proportional amplifier having at least a pair of receiver ports may also be used. In the embodiments which use the single receiver port proportional amplifier, it will be observed that the applicant has illustrated a receiver port which has a cross-sectional area substantially less than the cross-sectional area of the power nozzle, preferably less than one-half. In addition, the center line of the receiver port in which case is shown coincident with the centerline of the power nozzle. The receiver port is not restricted to coincident location but may be offset to provide special output characteristics. This configuration permits the sensing or measuring devices connected to the receiver port to examine the pressure recovery by examining the fluid pressure at a small, higher energy, cross-sectional area of the fluid stream. This permits the proportional amplifier to be much more sensitive to variations in fluid stream position, and hence variations in control port pressure, due to the fact that the pressure distribution across the power nozzle decreases from the center of the stream to the fringes. Thus, the receiver port is positioned to be in the center and, therefore, the highest pressure region of a stream flowing from the power nozzle. Slight variations in control port pressure would cause deflection of the fluid stream so that a lower pressure region is impinging upon the input port of the primary passage system. Thus, the device has greater sensitivity and provides an improved signal to noise ratio. For example, it has been found that pressure recovery with the fluid amplifier of this configuration can be as much as 85 percent of the pressure supply of this system. Furthermore, in graphing, or comparing, the pressure recovery with the control port pressure, it has been found that the results are substantially linear over the range of 85 percent of the supply port pressure down to approximately 15 percent of the supply pressure. Since it is known that the control port pressure will vary as a direct function of the temperature of the fluid, and the viscosity of the fluid will vary directly (for gas) or indirectly (for liquid) as a function of temperature and the specific relationships of viscosity and temperature are known for virtually all fluids, a direct calibration of this device for any desired fluid may be established and once established, the direct reading of pressure recovery for a given supply pressure may be directly converted into a viscosity reading. Thus, the applicant has accomplished the objectives of his invention in a combination which includes a proportional fluidic amplifier, a laminar flow resistor means for supplying a fluid under pressure whose viscosity is to be determined to both the laminar flow resistor and the fluidic element and pressure variation determining means comparing the pressure recovery with the control port pressure.

In the various embodiments of my invention, I haVe illustrated a resistance element variously denoted as 4 in FIG. 1, 18 in FIG. 2, and 118 in FIG. 3. This element is selected so that, when using the specific fluid's Reynolds number range the effect of this resistance element will be to cause pressure changes without affecting the laminar flow, or coherent flow characteristic of the fluid. That is to say that the resistance element will not cause the fluid to become turbulent. To further explain, the supply and control jets of fluid must be coherent jets with sufficient velocity to penetrate the surrounding fluid and reach the receiver with enough kinetic energy to generate a usable pressure in the receiver. The jets may be either in a laminar or turbulent condition as defined by respectively a parabolic or rectangular velocity distribution across the jets. The small receiver entrance as compared to the supply nozzle samples only a small cross section of the supply jets and in all cases the maximum pressure recovery aS attained by sAmpling the core or high velocity region of the supply jet. The concept does not require the supply nozzle flow to be at a critical Reynolds number readY to be triggered into a transition between laminar or turbulent flow conditions as in the well known turbulence amplifier concept. The turbulence amplifier requires supply to receiver nozzle spacings greater than 40 times the supply nozzle diameter, while the proportional amplifier of the viscometer will have spacings generally less than 10 times the nozzle diameter. The fluidic devices used with my invention are operating in the range of coherent fluid flow so that the fluid stream ejected from the power nozzle and from the control port and the fluid stream received by the receiving port will be coherent. In order to provide a resistance element capable of generating the necessary pressure difference without creating turbulent flow, I have illustrated in the embodiment of FIG. 3 a plurality of capillary tubes which are suitable under the proper operating conditions to generate the desired laminar flow resistance characteristic. It would also be possible to select a single tube or passage having the proper ratio of length to diameter which would also provide the desired laminar flow characteristic. Under proper circumstances, a simple orifice may also provide this characteristic.

While a preferred embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. A viscometer comprising in combination:

a pressure source of fluid the viscosity of which fluid is to be determined;

a fluidic proportional amplifier means having an input nozzle, a fluid interaction region, at least one control port, and at least one output port;

means interconnecting said source with said nozzle;

further means interconnecting said source with said at least one control port whereby said source provides a first fluid stream entering said interaction region from said nozzle and a second fluid stream entering said interaction region from said control port and proportionally diverting the flow of said first fluid stream;

fluid laminar resistance means within said further means operative to alter flow through said control port in response to fluid viscosity changes;

means connected to said at least one output port operative to determine output pressure; and means responsive to a function of said output pressure and said source pressure for indicating the viscosity of said fluid.

2. The device as claimed in claim 1 wherein:

said amplifier means include a pair of output ports and the second fluid stream is operative to vary the proportional distribution of the combine first and second fluid stream between said pair of output ports; and said means responsive to a function of said output pressure and said source pressure include differential pressure determining means operative to indicate the pressure differential between said pair of output ports.

3. The device as claimed in claim 2 wherein the second of said pair of output ports is a vent port communicating to the ambient.

4. The device as claimed in claim 3 wherein the firSt of said pair of output ports has a diameter no greater than one-half of the input nozzle diameter.

5. The device as claimed in claim 1 wherein said input nozzle and said at least one output port are coaxial.

* * * * *